(12) United States Patent
Ku

(10) Patent No.: US 7,750,514 B2
(45) Date of Patent: Jul. 6, 2010

(54) STATOR OF RECIPROCATING MOTOR

(75) Inventor: Bon-Cheol Ku, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 10/547,935

(22) PCT Filed: Mar. 11, 2004

(86) PCT No.: PCT/KR2004/000506

§ 371 (c)(1),
(2), (4) Date: Sep. 8, 2005

(87) PCT Pub. No.: WO2004/082102

PCT Pub. Date: Sep. 23, 2004

(65) Prior Publication Data

US 2006/0170292 A1 Aug. 3, 2006

(30) Foreign Application Priority Data

Mar. 11, 2003 (KR) .................. 10-2003-0015221

(51) Int. Cl.
*H02K 33/00* (2006.01)
*H02K 1/06* (2006.01)
(52) U.S. Cl. ............... 310/15; 310/254.1; 310/216.061; 310/216.023
(58) Field of Classification Search ............ 310/15, 310/216, 254, 216.023, 216.061, 12.24
See application file for complete search history.

(56) References Cited

U.S. PATENT DOCUMENTS

| 2,516,140 | A | * | 7/1950 | Nahman | 336/212 |
| 5,440,600 | A | * | 8/1995 | Fanning | 376/463 |
| 6,278,217 | B1 | * | 8/2001 | Kliman et al. | 310/254 |
| 6,331,745 | B2 | * | 12/2001 | Blakelock et al. | 310/214 |
| 2002/0135264 | A1 | * | 9/2002 | Song et al. | 310/254 |

FOREIGN PATENT DOCUMENTS

| CN | 1363134 A | 8/2002 |
| DE | 197 28 172 A1 | 1/1999 |
| EP | 0 606 974 A1 | 7/1994 |
| JP | 63-227978 A | 9/1988 |
| JP | 2001-231239 A | 8/2001 |
| JP | 2002-238237 A | 8/2002 |
| WO | WO-00/62406 A1 | 10/2000 |
| WO | WO-01/61830 A1 | 8/2001 |
| WO | WO-01/61831 A1 | 8/2001 |
| WO | WO-02/095909 A1 | 11/2002 |

* cited by examiner

*Primary Examiner*—Quyen Leung
*Assistant Examiner*—Alex W Mok
(74) *Attorney, Agent, or Firm*—Birch, Stewart, Kolasch & Birch, LLP

(57) ABSTRACT

Disclosed is a stator of reciprocating motor comprising: a stator including two lamination assemblies formed accordingly as a plurality of lamination sheets are stacked as a cylindrical shape or a circular arc shape; and a mover inserted into an air gap between said two lamination assemblies and linearly reciprocating. In the stator, the lamination sheets constituting the lamination assembly are thicker at an outer circumference side of the lamination assembly than at an inner circumference said thereof. According to this, a path of a flux applied to the lamination assembly is maximized thus to minimize a resistance of the flux.

6 Claims, 6 Drawing Sheets

```
FABRICATING PLANE SHEET
          ↓
PRESSING THE PLANE SHEET AND THEREBY
FABRICATING LAMINATION SHEET HAVING
DIFFERENT THICKNESS AT BOTH SIDES THEREOF
          ↓
STACKING THE LAMINATION SHEETS AS
CYLINDRICAL SHAPE
          ↓
FIXING THE LAMINATION SHEETS CONSTITUING
LAMINATION ASSEMBLY
```

STATOR OF RECIPROCATING MOTOR

TECHNICAL FIELD

The present invention relates to a reciprocating motor, and more particularly, to a stator of a reciprocating motor capable of minimizing a resistance against a flux by maximizing a volume occupied by lamination sheets in a unit volume of a cylindrical lamination assembly when a plurality of lamination sheets are stacked as a cylindrical shape, and a fabrication method thereof.

BACKGROUND ART

A motor converts an electric energy into a kinetic energy. The motor is divided into a rotary motor for converting an electric energy into a rotary movement force, a reciprocating motor for converting an electric energy into a linear reciprocation force, and etc.

FIG. 1 shows one example of the reciprocating motor. As shown, the reciprocating motor comprises: a stator composed of an outer core 100 and an inner core 200 inserted into the outer core 100; and a mover 300 movably inserted between the outer core 100 and the inner core 200 of the stator.

The mover 300 includes: a magnet holder 310 formed as a cylindrical shape and inserted between the outer core 100 and the inner ore 200; and a permanent magnet 320 coupled to the magnet holder 310.

A winding oil 400 and a bobbin 410 where the winding coil 400 is positioned are coupled to inside of the outer ore 100. The bobbin 410 is formed as a ring shape, and the winding coil 400 is formed accordingly as a wire is wound on the bobbin 410 several times. The bobbin 410 and the winding coil 400 can be coupled to the inner core 200.

The outer core 100 is formed as a cylindrical shape having an inner diameter of a certain size, and has a certain width. A sectional surface of the outer core 100 in a circumferential direction thereof is composed of an opening groove 110 inwardly open so that the winding coil 400 and the bobbin 410 can be located; a pass portion 120 corresponding to an outer side of the opening groove 110 for passing a flux; and a pole portion 130 corresponding to both ends of inside of the pass portion 120 for forming a pole.

The inner core 200 is formed as a cylindrical shape having a certain width. A sectional surface of the inner core 200 in a circumferential direction has a quadrangular shape having a certain width and length.

The unexplained reference numeral R denotes a fixing ring.

Operation of the reciprocating motor will be explained as follows.

As a power is supplied to the reciprocating motor, a current is applied to the winding coil 400. By the current, a flux is formed around the winding coil 400. The flux forms a closed loop along the pass portion 120 of the outer core and the inner core 200.

The flux formed at the pass portion 120 of the outer core and the inner core 200 interacts with a flux formed by the permanent magnet 310 of the mover, so that a force is applied to the permanent magnet 310 in an axial direction. By the force applied to the permanent 310, the mover moves in the axial direction. If a direction of the current applied to the winding coil 400 is alternated, the mover 300 linearly reciprocates.

The outer core 100 and the inner core 200 constituting the stator S have various shapes and fabrication methods. The outer core 100 and the inner core 200 of the stator are fabricated by stacking a plurality of thin plates having a predetermined shape in order to minimize a flux loss. If the outer core 100 or the inner core 200 is one body not a lamination assembly, a flux loss is generated by a copper loss.

FIG. 2 is a disassembled perspective view showing one example of the inner core of reciprocating motor.

As shown, the inner core 200 of the reciprocating motor is a cylindrical lamination assembly formed accordingly as quadrangular lamination sheets IS having a certain thickness are stacked as a cylindrical shape. The lamination sheets IS are stacked so that relatively long side edges 1 can be positioned at an inner circumferential side and at an outer circumferential side of the cylindrical lamination assembly. An opened groove 3 is formed at both short side edges 2 of each lamination sheet. By the grooves 3, a ring groove 210 is respectively formed at both side surfaces of the cylindrical lamination assembly. The fixing ring R of a ring shape is respectively coupled to the ring grooves 210, thereby fixing the lamination sheets IS.

The outer core 100 of the reciprocating motor is constricted as the same shape as the inner core. That is, the outer core 100 is formed accordingly as lamination sheets of a predetermined shape are stacked as a cylindrical shape. The lamination sheets are radially positioned toward the center of the cylindrical lamination assembly.

However, in the stator of the reciprocating motor, that is, in the outer core 100 and the inner core 200 constricted as a cylindrical lamination assembly, a volume occupied by the lamination sheets is less in a unit volume of the cylindrical lamination assembly. According to this, a flux density is relatively high at the time of forming a flux thus to increase a flux resistance. More specifically, as shown in FIG. 3, since the inner core 200 is constructed as a cylindrical lamination assembly that the lamination sheets IS having a certain thickness are stacked as a cylindrical shape, a dense state between adjacent lamination sheets IS is maintained at an inner circumferential surface side of the cylindrical lamination assembly. However, at an outer circumferential surface side of the cylindrical lamination assembly, an interval h between the lamination sheets IS is formed. The interval h between the lamination sheets IS is increased with a certain ratio towards the outer circumferential surface side from the inner circumferential surface side of the cylindrical lamination assembly. In case that the outer core 100 is constructed as a cylindrical lamination assembly, the above explanation is also applied.

According to this, much space is formed in the cylindrical lamination assembly, so that a volume occupied by the lamination sheets IS is less in the unit space of the cylindrical lamination assembly. Therefore, a flux path becomes narrow thus to increase a flux resistance and thereby to lower a motor efficiency.

DISCLOSURE

Therefore, an object of the present invention is to provide a stator of a reciprocating motor capable of minimizing a resistance against a flux by maximizing a volume occupied by lamination sheets in a unit volume of a cylindrical lamination assembly when a plurality of lamination sheets are stacked as a cylindrical shape, and a fabrication method thereof.

To achieve these and other advantages and in accordance with the purpose of the present invention, as embodied and broadly described herein, there is provided a stator of a reciprocating motor comprising a stator including two lamination assemblies formed accordingly as a plurality of lamination sheets are stacked as a cylindrical shape or a circular arc shape; and a mover inserted into an air gap between said two lamination assemblies and linearly reciprocating, wherein the lamination sheets constituting the lamination assembly are thicker at an outer circumference side of the lamination assembly than at an inner circumference side thereof.

To achieve these and other advantages and in accordance with the purpose of the present invention, as embodied and broadly described herein, there is also provided a fabrication method of a stator of a reciprocating motor comprising: cutting a substrate having a certain thickness as a certain size; pressing the cut plane sheets so that a thickness of one side can be different from a thickness of another side, and thereby fabricating lamination sheets; and stacking the lamination sheets as a cylindrical shape so that a relatively thin part of the lamination sheet can be inwardly positioned and a relatively thick part thereof can be outwardly positioned.

The foregoing and other objects, features, aspects and advantages of the present invention will become more apparent from the following detailed description of the present invention when taken in conjunction with the accompanying drawings.

MODE FOR INVENTION

Reference will now be made in detail to the preferred embodiments of the present invention, examples of which are illustrated in the accompanying drawings.

Hereinafter, a stator of a reciprocating motor awarding to the present invention and a fabrication method thereof will be explained in more detail with reference to the attached drawings.

Figure 4:
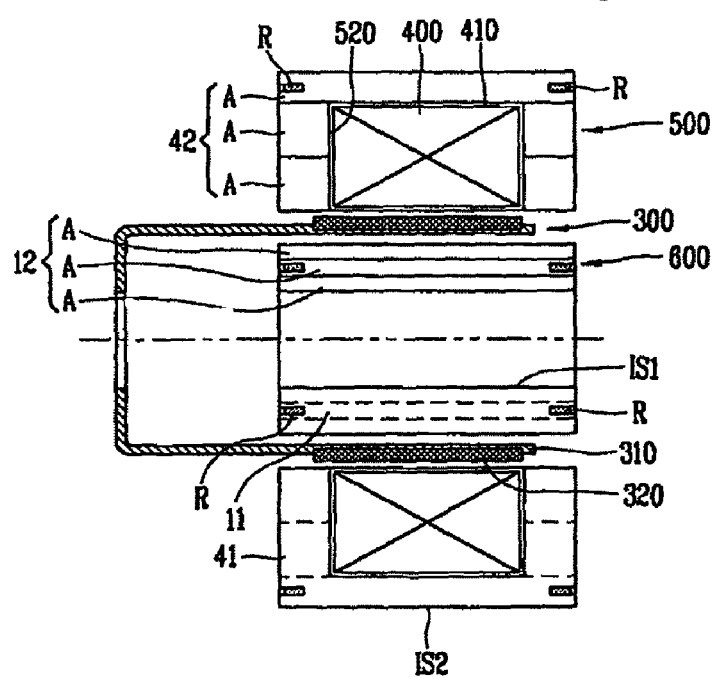
FIGS. 4 and 5 are sectional and frontal views of a reciprocating motor provided with a reciprocating motor stator awarding to one embodiment of the present invention.
Figure 5:
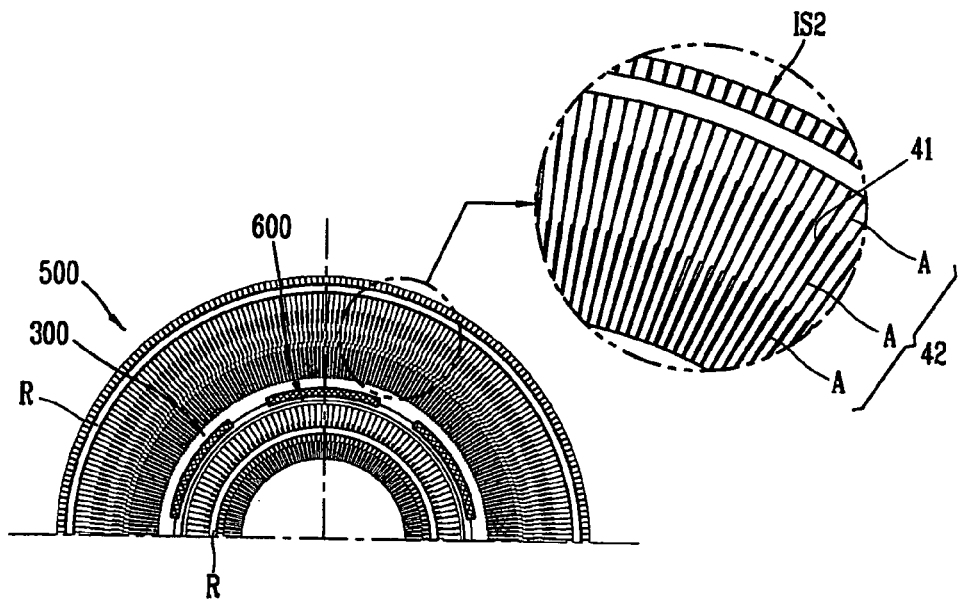

FIGS. 4 and 5 are sectional and frontal views of a reciprocating motor provided with a reciprocating motor stator awarding to one embodiment of the present invention. The same reference numerals were given to the same parts as those of the conventional one.

As shown, the reciprocating motor according to the present invention comprises: a stator composed of an outer core 500 and an inner core 600 inserted into the outer core 500; and a mover 300 movably inserted between the outer core 500 and the inner core 600 of the stator.

A bobbin 410 and a winding coil 400 wound by a wire on the bobbin 410 are coupled to inside of the outer core 500. The bobbin 410, the winding coil 400, and the mover 300 have the same structure as those of the conventional one, thereby omitting the explanations.

Figure 6:
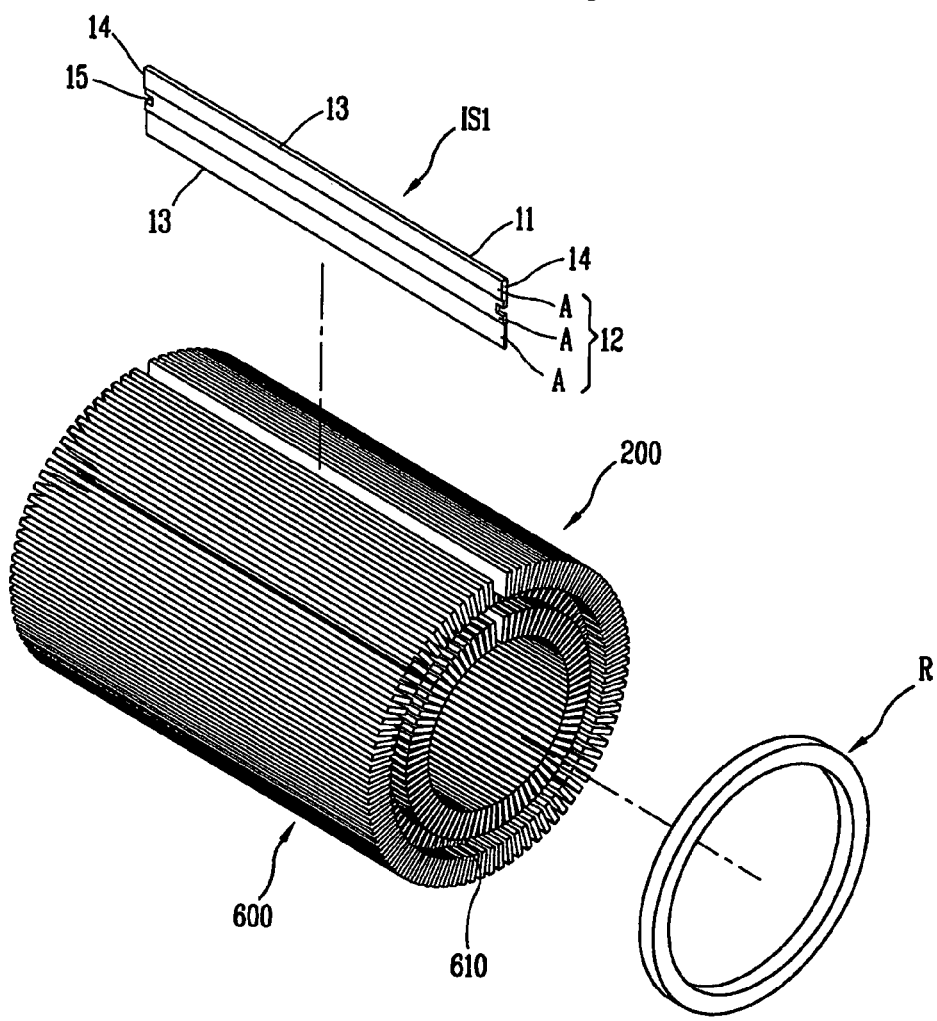
FIG. 6 is a disassembled perspective view showing an inner core constituting the stator of the reciprocating motor.
Figure 7:
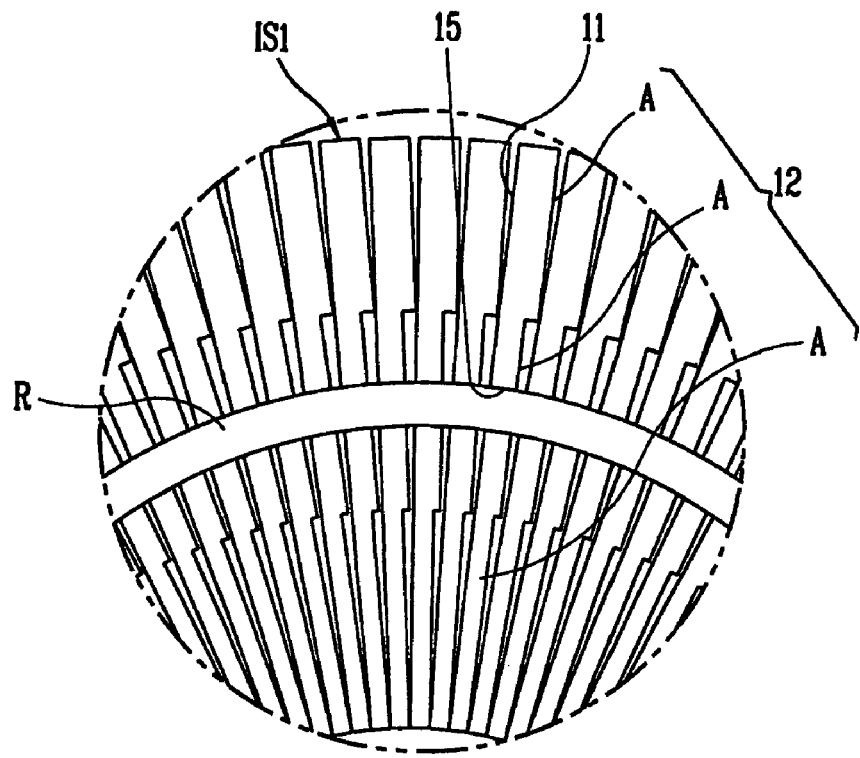
FIG. 7 is a frontal view of the inner core by a partial enlargement.

As shown in FIGS. 6 and 7, the inner core 600 is a cylindrical lamination assembly that a plurality of lamination sheets IS1 are stacked as a cylindrical shape.

The thickness of the lamination sheet IS1 constituting the lamination assembly is thicker at an outer circumference side of the lamination assembly than at an inner circumference side thereof.

The lamination sheet IS1 is composed of a plane portion 11 formed as a rectangular plane, and a step portion 12 formed at the opposite side of the plane portion 11 and having a plurality of consecutive step surfaces A of a stair shape. The step surfaces A are surfaces shown in FIG. 3. The more the number of the step surfaces A is, the more effective. Two long side edges 13 have a different thickness, respectively. A groove 15 is respectively formed at two short side edges 14 which are relatively short. The groove 15 is formed as a rectangular shape of which one side is open.

The lamination sheets IS1 constituting the cylindrical lamination assembly are stacked so that the plane portion of one lamination sheet and the step portion of another adjacent lamination sheet can be in contact with each other.

By the grooves 15 of the lamination sheets IS1 constituting the cylindrical lamination assembly, a ring groove 610 of a ring shape is respectively formed at both side surfaces of the cylindrical lamination assembly. A fixing ring R of a ring shape is respectively forcibly-inserted into the ring grooves 610.

The cylindrical lamination assembly constituted with the plurality of lamination sheets IS1 is fixed by welding both sides surfaces thereof.

Figure 8:
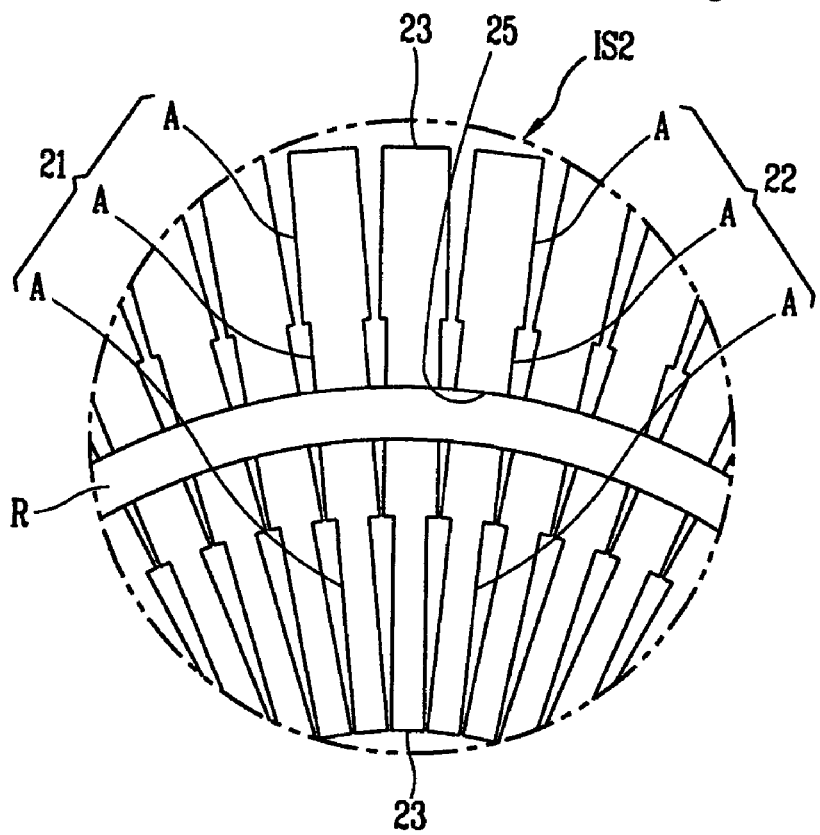
FIGS. 8 and 9 are perspective views showing other embodiments of the inner core by a partial enlargement.

As a modification example of the lamination sheet, as shown in FIG. 8, a lamination sheet IS2 includes: a first step portion 21 having a plurality of step surfaces A of a stair shape; and a second step portion 22 formed at the opposite side of the first step portion 21 and having a plurality of step surfaces A of a stair shape. That is, the lamination sheet IS2 is formed as a rectangular shape, and is provided with the first step portion 21 and the second step portion 22 at both side surfaces thereof.

Figure 1:
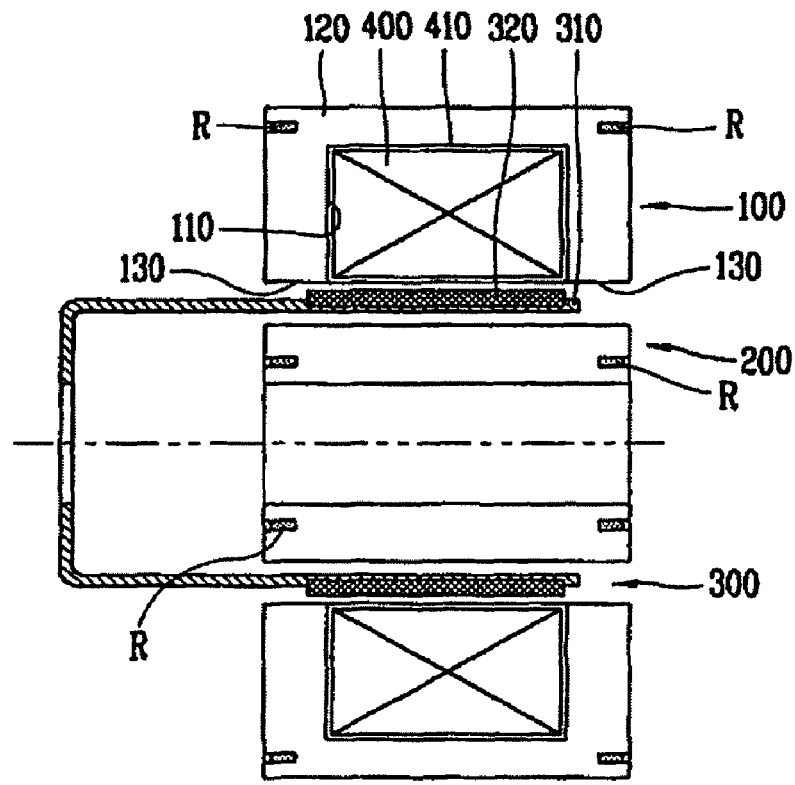
FIG. 1 is a sectional view showing a general reciprocating motor.
Figure 2:
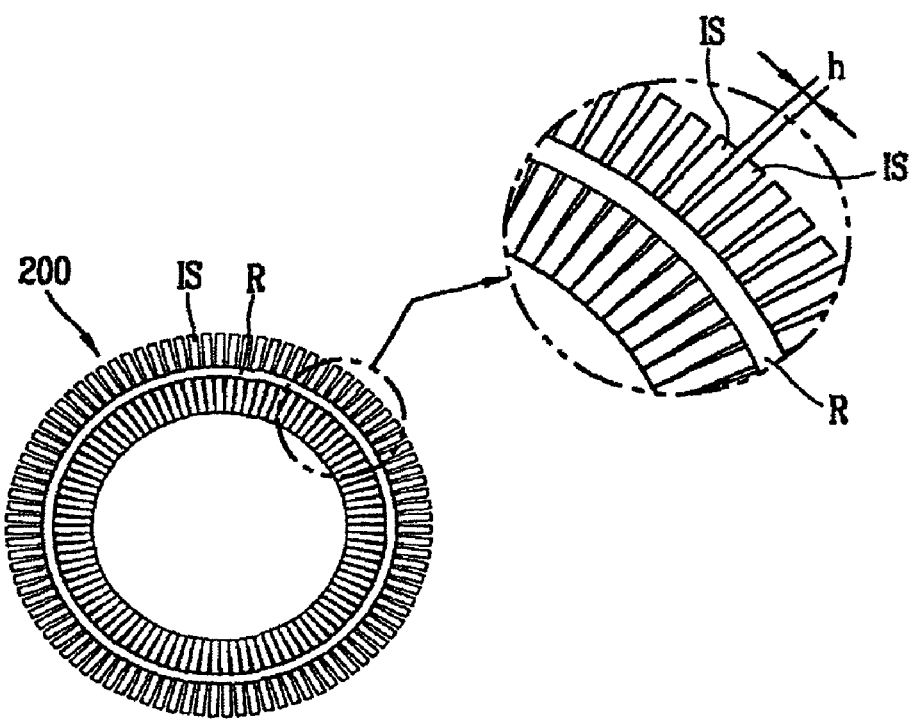
FIG. 2 is a disassembled perspective view showing one example of an inner core of the reciprocating motor.
Figure 3:
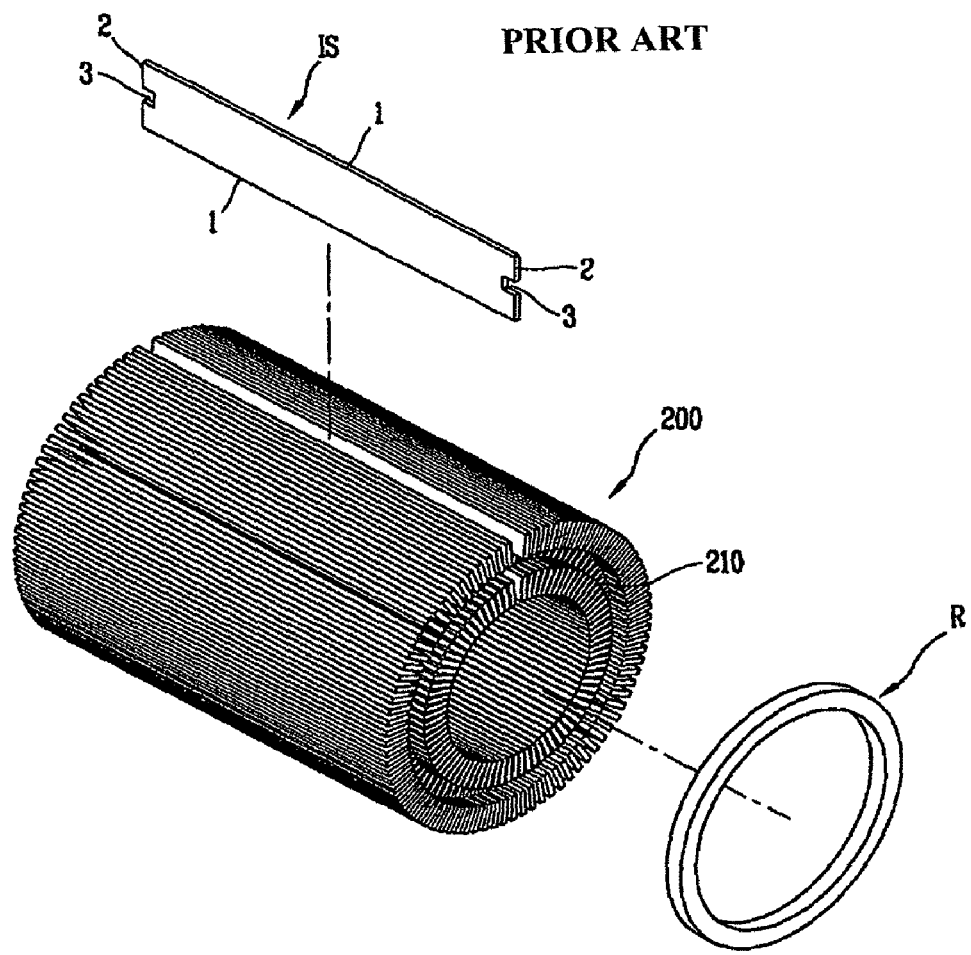
FIG. 3 is a frontal view showing the inner core of the reciprocating motor.

The step surfaces A are surfaces shown in FIG. 3. The more the number of the step surfaces A is, the more effective. Two long side edges 23 have a different thickness, respectively. A groove 25 is respectively formed at two short side edges which are relatively short. The groove 25 is formed as a rectangular shape of which one side is open.

By the grooves 25 of the lamination sheets IS2 constituting the cylindrical lamination assembly, a ring groove 610 of a ring shape is respectively formed at both side surfaces of the cylindrical lamination assembly. A fixing ring R of a ring shape is respectively forcibly-inserted into the ring grooves 610.

Figure 9:
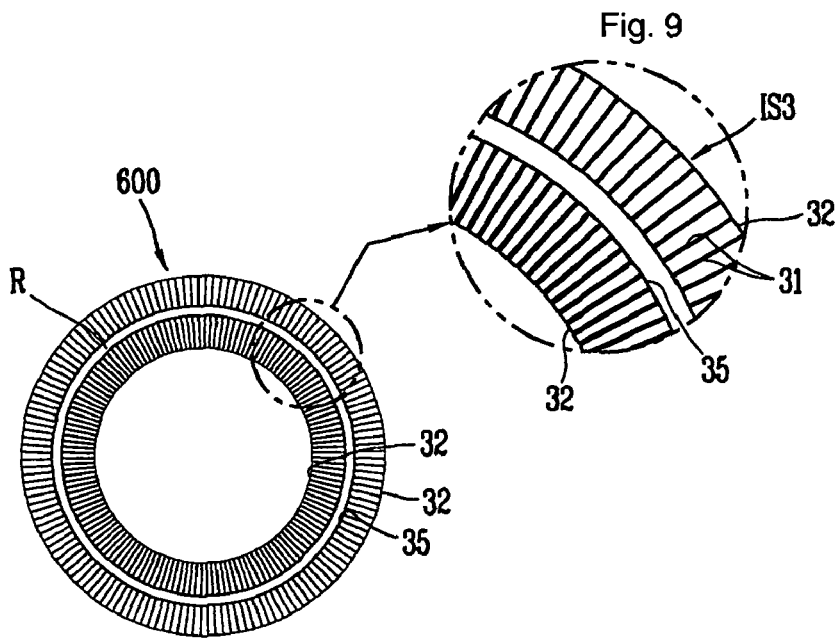

As another modification example of the lamination sheet, as shown in FIG. 9, a lamination sheet IS3 includes an inclined plane portion 31 of a rectangular shape that both side surfaces thereof are inclined towards the center axis. Two long side edges 32 of the lamination sheet IS3 have a different thickness, respectively. A sectional shape of the lamination sheet IS3 in a horizontal direction is trapeziform. A groove 35 is formed at two short side edges of the lamination sheet IS3, respectively. The groove 35 is formed as a quadrangular shape of which one side is open.

By the grooves 35 of the lamination sheets IS3 constituting the cylindrical lamination assembly, a ring groove 610 of a ring shape is respectively formed at both side surfaces of the cylindrical lamination assembly. A fixing ring R of a ring shape is respectively forcibly-inserted into the ring grooves 610.

In the inner core 600 constituted with the cylindrical lamination assembly, the lamination sheet IS constituting the cylindrical lamination assembly has a thicker part at the outer circumferential side of the cylindrical lamination assembly than at the inner circumferential side thereof. According to this, not only the interval between lamination sheets of the outer circumferential side of the cylindrical lamination assembly but also the interval between lamination sheets become minimal. Therefore, a volume occupied by the lamination sheets in a unit volume of the cylindrical lamination assembly constituting the inner core 600 becomes maximum.

The outer core 500 is a lamination assembly that a plurality of lamination sheets having a predetermined shape are stacked. The lamination sheet IS4 constituting the lamination assembly has a thicker thickness at the outer circumferential side of the lamination assembly than at the inner circumferential side thereof.

The lamination sheet IS4 of the outer core is composed of a plane portion 41 formed as a rectangular plane, and a step portion 42 formed at the opposite side of the plane portion 41 and having a plurality of consecutive step surfaces A of a stair shape. The step surfaces A are surfaces shown in FIG. 3. The more the number of the step surfaces A is, the more effective. Two long side edges have a different thickness, respectively.

An opening groove 520 of a quadrangular shape is formed at one thin edge of the lamination sheet IS4. The opening groove 520 can be formed as various shapes. A groove 45 is formed at two short side edges of the lamination sheet IS4, respectively. The groove 45 is formed as a quadrangular shape of which one side is open.

The lamination sheets IS4 constituting the cylindrical lamination assembly are stacked so that the plane portion 41 of one lamination sheet and the step portions 42 of another adjacent lamination sheet can be in contact with each other.

By the grooves 45 of the lamination sheets IS4 constituting the cylindrical lamination assembly, a ring groove 510 of a ring shape is respectively formed at both side surfaces of the cylindrical lamination assembly. By the opening groove 520, a bobbin inserting groove of a ring shape for inserting a bobbin 410 is formed. A fixing ring R of a ring shape is respectively forcibly-inserted into the ring grooves 510.

The lamination sheets IS4 constituting the outer core 500 can be modified as various shapes like the lamination sheets constituting the inner core 600.

In the outer core 500 constituted with the cylindrical lamination assembly, like in the inner core 600, not only the interval between lamination sheets of the outer circumferential side of the cylindrical lamination assembly but also the interval between lamination sheets become minimal. Therefore, a volume occupied by the lamination sheets in a unit volume of the cylindrical lamination assembly constituting the outer core 500 becomes maximum.

According to the stator of the reciprocating motor of the present invention, both the outer core 500 and the inner core 600 inserted into the outer core can be constituted as a lamination assembly. It is also possible to constitute the outer core 500 as a lamination assembly and to constitute the inner core 600 inserted into the outer core 500 as a non-lamination assembly. It is also possible to constitute the outer core 500 as a non-lamination assembly and to constitute the inner core 600 as a lamination assembly.

Figure 10:
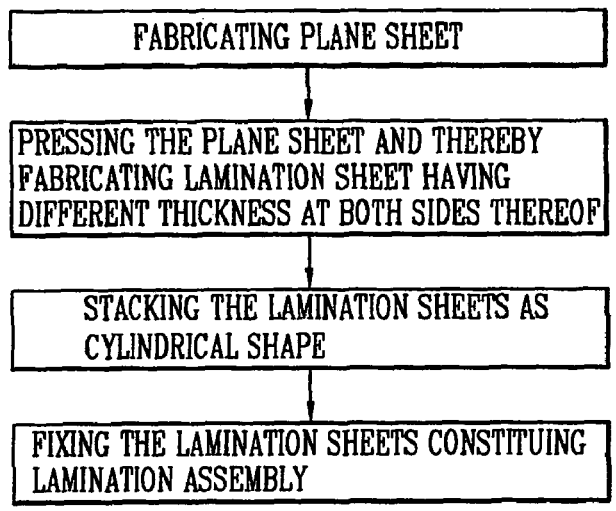
FIG. 10 is a flow chart showing a fabrication method of the stator of the reciprocating motor.

A fabrication method of the stator of the reciprocating motor of the present invention will be explained. As shown in FIG. 10, a substrate having a certain thickness is cut as a certain size. Then, the cut plane sheets are pressed so that a thickness of one side can be different from a thickness of another side, and thereby lamination sheets are fabricated.

The cut plane sheets are plural as a rectangular shape. The cut plane sheet is pressed so that a thickness of one long side can be different from a thickness of another long side.

Then, the lamination sheets are stacked as a cylindrical shape so that a relatively thin part of the lamination sheet can be positioned at the inner circumferential side of the cylindrical assembly and a relatively thick part thereof can be positioned at the outer circumferential side of the cylindrical assembly.

The lamination sheets constituting the cylindrical lamination assembly are fixed by a fixing ring R or by a welding.

Figure 11:
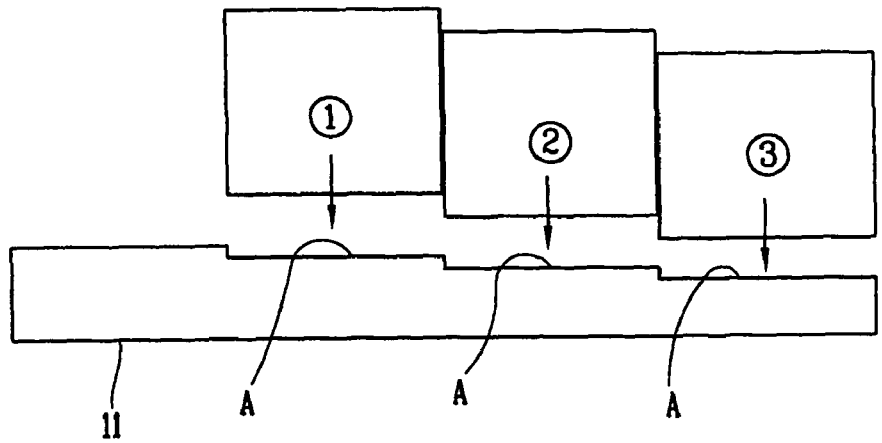
FIGS. 11 and 12 are frontal views showing the fabrication method of the stator of the reciprocating motor.

In the pressing step, as shown in FIG. 11, only one side surface of the plane sheet is pressed step by step as a stair shape. That is, one side surface of the plane sheet is pressed step by step thus to form a plurality of step surfaces A such as stairs. The lamination sheets IS are stacked so that the plane of one lamination sheet and the step surfaces A of another adjacent lamination sheet can be in contact with each other.

Figure 12:
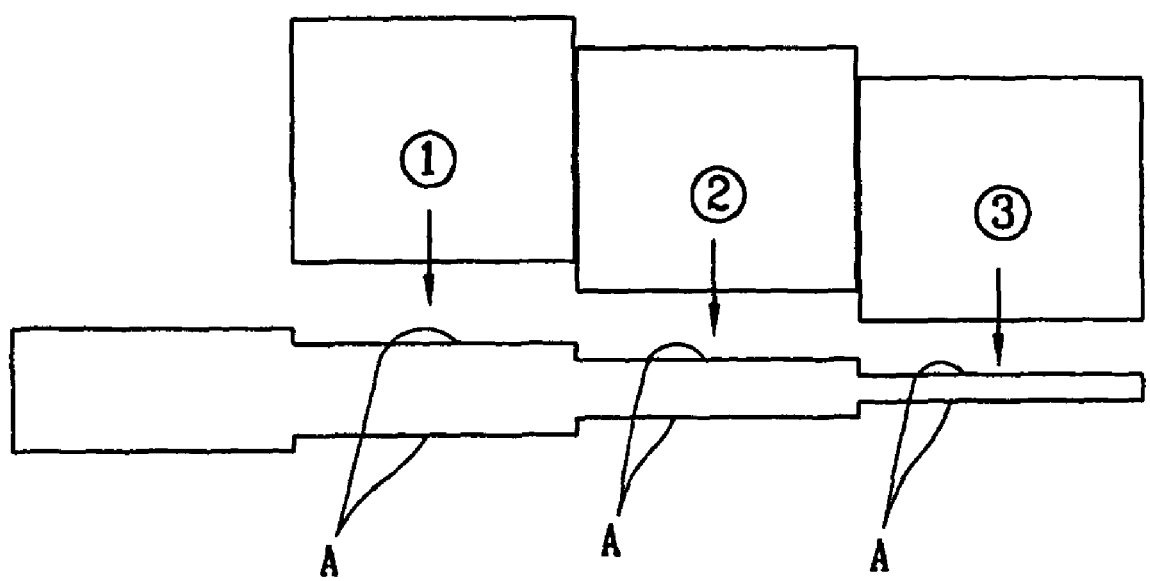

In the pressing step, as shown in FIG. 12, both side surfaces of the plane sheet can be pressed as a stair shape step by step. That is, a plurality of step surfaces A of a stair shape are respectively formed at both side surfaces of the plane sheet.

In order to form the step surfaces at both side surfaces of the plane sheet, one side surface of the plane sheet is pressed as a stair shape step by step, and then the plane sheet is overturned thus to press another side surface thereof as a stair shape step by step.

It is also possible to simultaneously press both side surfaces of the plane sheet as a stair shape step by step.

In the cylindrical lamination assembly, not only the interval between lamination sheets of the outer circumferential side thereof but also the interval between lamination sheets become minimal.

Hereinafter, the stator of the reciprocating motor and the fabrication method thereof according to the present invention will be explained.

In the reciprocating motor provided with the reciprocating motor stator of the present invention, like in the conventional reciprocating motor, as a power is supplied to the reciprocating motor, a current is applied to the winding cell 400. By the current, a flux is formed at the outer core 500 and the inner core 600 of the stator. The flux formed at the outer core 500 and the inner core 600 of the stator interacts with a flux formed by the permanent magnet 320 of the mover, so that a force is applied to the permanent magnet 320 and thus the mover 300 moves.

In said process, since the stator of the present invention is provided with a cylindrical lamination assembly that a plurality of lamination sheets having different thickness, a volume occupied by the lamination sheets in a unit volume of the cylindrical lamination assembly becomes maximum. According to this, a flux path formed at the cylindrical lamination assembly of the stator is maximized thus to minimize a flux resistance.

Also, since contact parts between adjacent lamination sheets of the cylindrical lamination assembly are increased, a vibration of the lamination sheets or contact noise can be prevented at the time of a vibration generation while the reciprocating motor is operated.

As aforementioned, in the stator of the reciprocating motor and the fabrication method thereof awarding to the present invention, the path of the flux generated by the current applied to the winding oil and the permanent magnet is maximized thus to minimize the flux resistance. According to this, not only an output of the motor but also the motor efficiency can be enhanced.

Additionally, since a supported state between the lamination sheets is firm, the vibration and noise between the lamination sheets generated at the time of a vibration generation during the motor operation can be prevented thereby to enhance the motor reliability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A stator of a reciprocating motor comprising:
    a stator including inner and outer lamination assemblies formed as a plurality of monolithically formed lamination sheets stacked as a cylindrical shape or a circular arc shape; and
    a mover inserted into an air gap between the inner and outer lamination assemblies and linearly reciprocal in the air gap,
    wherein the monolithically formed lamination sheets constituting the inner or outer lamination assembly are thicker at an outer circumference side of the inner or outer lamination assembly than at an inner circumference side thereof, and
    wherein each monolithically formed lamination sheet of the plurality of monolithically formed lamination sheets is composed of a plurality of first step portions formed at one side of the monolithically formed lamination sheet, each of the plurality of first step portions formed between two non-folded step surfaces of a stair shape, the monolithically formed lamination sheet having different thicknesses at the step surfaces.

2. The stator of the reciprocating motor of claim 1, wherein another side of the monolithically formed lamination sheet is composed of a plane portion formed as a quadrangular plane.

3. The stator of the reciprocating motor of claim 1, wherein a plurality of second step portions are formed at another side of the each monolithically formed lamination sheet and formed between two non-folded step surfaces of a stair shape.

4. The stator of the reciprocating motor of claim 1, wherein a groove is respectively formed at both edges of the monolithically formed lamination sheet, and fixing rings of a ring shape are coupled to ring grooves formed at the inner or outer lamination assembly by the grooves of the monolithically formed lamination sheet.

5. The stator of the reciprocating motor of claim 1, wherein the monolithically formed lamination sheets constituting the inner or outer lamination assembly are fixed by a welding.

6. A stator of a reciprocating motor comprising:
    a stator constituted with an outer core having a winding coil and an inner core inserted into the outer core with a certain air gap; and
    a mover inserted into the air gap and linearly reciprocal in the air gap,
    wherein the outer core or the inner core is a lamination assembly in which a plurality of monolithically formed lamination sheets are stacked, and the monolithically formed lamination sheets constituting the lamination assembly are thicker at an outer circumference side of the lamination assembly than at an inner circumference side thereof, and
    wherein each monolithically formed lamination sheet of the plurality of monolithically formed lamination sheets is composed of a plurality of first step portions formed at one side of the monolithically formed lamination sheet, each of the first step portions formed between two non-folded step surfaces of a stair shape, the monolithically formed lamination sheet having different thicknesses at the step surfaces.

* * * * *